United States Patent
Ślipko et al.

(10) Patent No.: US 7,164,448 B2
(45) Date of Patent: Jan. 16, 2007

(54) METHOD FOR SCROLLING MPEG-COMPRESSED PICTURES

(75) Inventors: Roman Ślipko, Zablocie (PL); Patryk Charydczak, Zielona Góra (PL); Marcin Zalewski, Zielona Góra (PL)

(73) Assignees: Advanced Digtial Broadcast Polska Sp. z o.o., Zielona Góra (PL); Advanced Digital Broadcast Ltd., Taipei (TW)

( * ) Notice: Subject to any disclaimer, the term of this patent is extended or adjusted under 35 U.S.C. 154(b) by 421 days.

(21) Appl. No.: 10/497,420

(22) PCT Filed: Nov. 28, 2002

(86) PCT No.: PCT/PL02/00098

§ 371 (c)(1),
(2), (4) Date: May 27, 2004

(87) PCT Pub. No.: WO03/056542

PCT Pub. Date: Jul. 10, 2003

(65) Prior Publication Data

US 2005/0041733 A1 Feb. 24, 2005

(30) Foreign Application Priority Data

Nov. 30, 2001 (PL) .................................. 350983

(51) Int. Cl.
*H04N 5/445* (2006.01)
(52) U.S. Cl. ....................... 348/564; 348/563; 348/714; 348/716
(58) Field of Classification Search ................ 348/564, 348/563, 569, 714, 716, 511; 345/352–353, 345/327–328, 121–125; *H04N 5/445*
See application file for complete search history.

(56) References Cited

U.S. PATENT DOCUMENTS

| 4,612,569 | A | * | 9/1986 | Ichinose ..................... 348/588 |
| 5,208,588 | A | | 5/1993 | Nishiyma |
| 5,457,475 | A | | 10/1995 | Maruyama et al. |
| 5,867,208 | A | | 2/1999 | McLaren |
| 6,067,068 | A | | 5/2000 | Hussian |
| 6,128,032 | A | * | 10/2000 | Oh et al. ..................... 725/134 |
| 6,417,888 | B1 | * | 7/2002 | Dunn et al. .................. 348/569 |

* cited by examiner

*Primary Examiner*—Trang U. Tran
(74) *Attorney, Agent, or Firm*—Matthias Scholl; Scholl, Matthias

(57) ABSTRACT

A method for scrolling MPEG-compressed pictures consists in decoding a sequence of pictures (34, 35, 36) or any two pictures to be viewed by a MPEG decoder (5) and storing the sequence of pictures (35, 35, 36) or any two pictures in MPEG decoder memory. Then the sequence of pictures (34, 35, 36) or any two pictures is formed as a group of pictures (37), which is transferred to the first screen buffer (24) which is active. In the following step, any another compressed picture, after decoding in the MPEG decoder (5), is stored in a MPEG decoder memory as a decoder new picture and then is transferred from the MPEG decoder memory to the first screen buffer (24), where its edge line perpendicular to the intended scrolling direction is adjoined to the external edge of the group of pictures (37). The new picture is placed outside the viewing area and next the entire viewing area is shifted until the marginal picture lying at the opposite side of the group of pictures (37) in relation to the adjoined new picture is removed from the viewing area (21), and the newly decoded picture is placed in this area.

12 Claims, 16 Drawing Sheets

METHOD FOR SCROLLING MPEG-COMPRESSED PICTURES

CROSS-REFERENCE TO RELATED APPLICATIONS

This is a National Stage Application of International Patent Application No. PCT/PL 02/00098, with an international filing date of Nov. 28, 2002, which is based on Polish Patent Application No. P-350983, filed Nov. 30, 2001.

BACKGROUND OF THE INVENTION

1. Field of the Invention

The present invention relates to method for scrolling MPEG-compressed pictures.

2. Brief Description of the Background of the Invention Including Prior Art

In many cases it is necessary to display pictures on a screen, in order to show products or to present various images or texts containing information, for instance, about train departures and arrivals. In existing technology, displaying new information and showing a new picture has consisted in the removal of earlier information from the screen and substituting it with a new one. This procedure does not provide for the possibility of simultaneous viewing and comparison of information or pictures, or the possibility of partial clearing of picture or text, in order to substitute this part with a new picture or text.

An example of a procedure which allows viewing a picture which is larger than a standard MPEG picture in length or width is described in the U.S. Pat. No. 5,867,208. In the preferred embodiment, an interactive television system comprises a video delivery system for providing video content, and at least one subscriber television set including a display screen. The subscriber television set is coupled to the video delivery system. The video delivery system provides a compressed picture, which is subdivided into slices and possibly groups of slices such that the image may be scrolled smoothly. The subscriber television set receives the compressed picture and operates to scroll in the compressed picture as desired by the user.

Another method is described in the U.S. Pat. No. 5,208, 588. A picture which is larger than a standard picture is scrolled continuously by removing lines at the bottom of the screen and inserting lines at the top of the screen, or inversely. This procedure does also not allow to compare the content of the selected picture with the content of another one.

SUMMARY OF THE INVENTION

1. Purposes of the Invention

It is an object of this invention to provide a method for fluently and simultaneously displaying any number of pictures.

This and other objects and advantages of the present invention will become evident from the description which follows.

2. Brief Description of the Invention

According to the present invention, the method for scrolling MPEG-compressed pictures consists in matching each picture or a sequence of pictures chosen from a set of pictures or picture sequences to be scrolled to a unique number. Next, from the sequence of pictures or any two pictures, after decoding by an MPEG decoder and storing in an MPEG decoder memory, there is formed a group of pictures, which is transferred to the first screen buffer that is active. The group of pictures is displayed on the screen. In the following step, any another compressed picture, after decoding in the MPEG decoder, is stored in the MPEG decoder memory as a decoded new picture and then is transferred from the MPEG decoder memory to the first screen buffer, where its edge line perpendicular to the intended scrolling direction is adjoined to the external edge of the group of pictures. The new picture is placed outside the viewing area. Next, the entire viewing area is shifted until the marginal picture lying at the opposite side of the group of pictures in relation to the adjoined new picture is removed from the viewing area, and the newly decoded picture is placed in this area.

After the shifting of the viewing area in order to display the new picture, a new group of pictures, excluding the removed picture, but including the newly decoded picture and at least one neighbouring picture, can be copied from the first active screen buffer to the second screen buffer, which is inactive. In effect, next to the following group of pictures a place is ready for the successive decoded picture. Afterwards, the first screen buffer is inactivated through shifting the viewing area from the first screen buffer to the second screen buffer, in order to display the group of pictures which had been copied earlier to the second buffer.

The unique ordinal number can be matched to each picture or the sequence of pictures chosen from the set of pictures and picture sequences during formulation of the set of pictures and the sequence of pictures.

Matching the unique number to each picture or sequence of pictures chosen from the set of pictures or picture sequences can be realized in the MPEG decoder after the decoding procedure executed in the MPEG decoder.

Matching the unique number to each picture or sequence of pictures can be realized during storing said picture or sequence of pictures in the screen memory.

During sending the picture to the first screen buffer, or to the second screen buffer, the new picture can be re-scaled in such a way that its dimension measured in the direction of picture scroll is equal to the dimension of the visible area of the screen buffer measured in the shift direction of pictures divided by the number of displayed pictures.

The vertical shift of the displayed area can be obtained by changing the number of image lines to be neglected in the course of signal transformation to analogue form, while the number of lines contributing to the total displayed area remains constant.

The horizontal shift of the displayed area can be obtained by changing the number of pixels to be executed in the course of signal transformation to analogue form, while the number of pixels contributing to the total display area remains constant.

The selection of the sequence of pictures, or at least any two pictures, and the choice of any compressed picture to display, can be realized after the codes are entered pertaining to any pictures or compressed pictures related to the set of pictures or picture sequences.

The selection of the sequence of pictures, or at least any two pictures, and the choice of any compressed picture can be realized automatically.

The selection of the sequence of pictures or at least any two pictures, and the choice of any compressed picture can be realized by a predetermined method.

After re-scaling the new picture, its dimension measured perpendicularly to the movement direction of pictures can be changed proportionally to the change in dimension measured in the movement direction of pictures, while the dimension of the visible area of the screen buffer measured perpendicularly to the movement direction of pictures is equal to the dimension of re-scaled picture measured perpendicularly to the movement direction of pictures.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF DRAWINGS

The object of this invention is shown in implementation examples on the enclosed drawings, where.

DESCRIPTION OF INVENTION AND PREFERRED EMBODIMENT

The presented method of pictures scrolling makes it possible for a user to browse a database. Data from this base are presented in a graphic form. The exemplary scrolling mechanism, which is described here, employs a popular MPEG coding standard, introduced by a group of experts from the Motion Pictures Experts Group, which is a standard of digital signal compression. The MPEG standard enables both the registration of video sequences, and individual pictures. This standard uses three types of pictures: I—as the main picture, P—as the forecasted picture, and B—as the picture interpolated in both directions. In the presented mechanism, pictures can be compressed in MPEG standard as I, P and B pictures.

Figure 1:
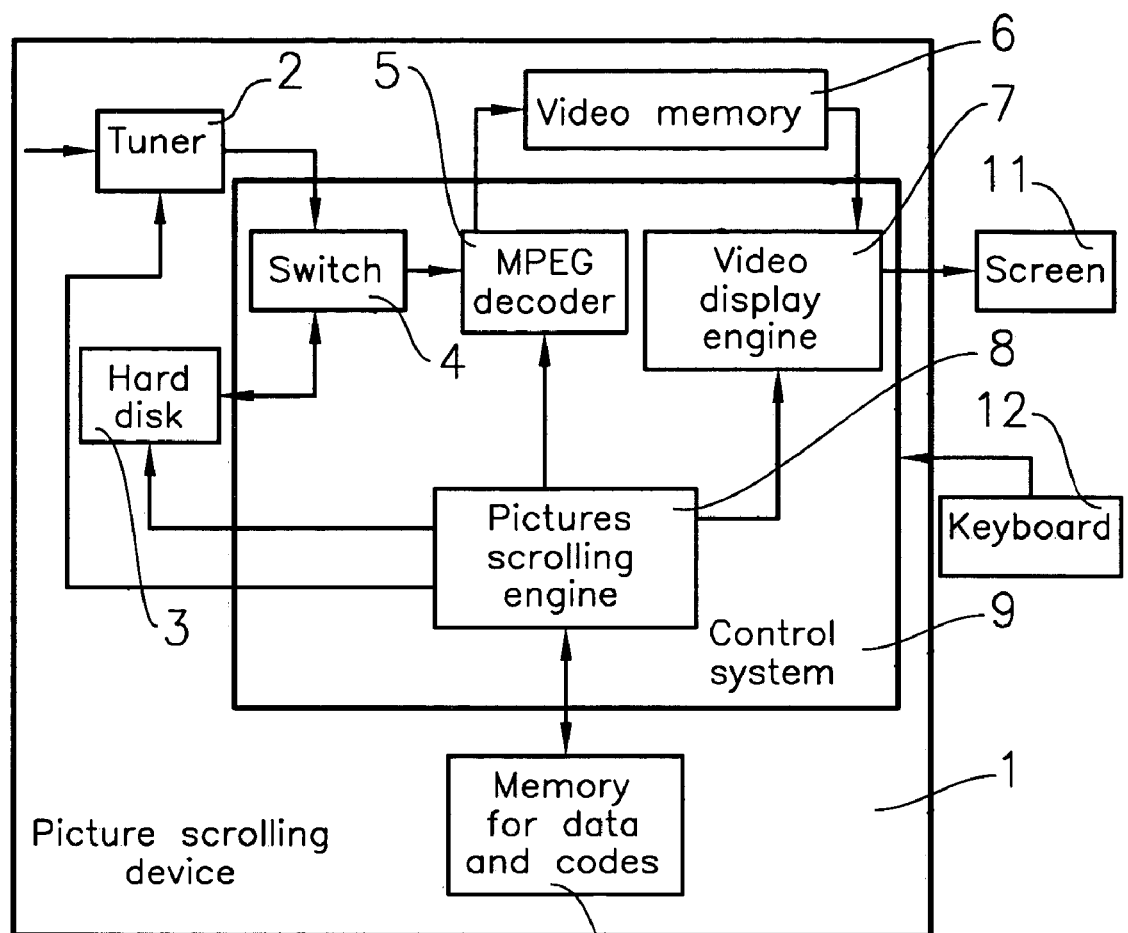
FIG. 1 shows a block diagram of a picture scrolling unit.

A unit 1 used for viewing the pictures is shown in FIG. 1 as a block diagram. The unit consists of a tuner 2, a hard disk 3, a switch 4, an MPEG decoder 5, a video memory 6, a vision display module L a pictures scrolling module 8, a control system 9, a memory of data and codes 10.

In the presented system, data are read by the tuner 2, which may be a unit enabling the reception of data sent by radio, satellite or cable. For example, it may be a radio tuner, which can be replaced by any device which allows the communication with the world, such as a modem or an Internet link. Data may also be read from the hard disk 3 which is used to store data like pictures, which are displayed on the screen of a TV set 11. In the presented system the switch 4 allows for the collection of data from various sources, for example from the tuner 2 or the hard disk 3, and sending them to the MPEG decoder 5, which decodes pictures stored in MPEG format. As its input, the MPEG decoder receives compressed data, and after its decoding, registers them in the video memory 6, or the screen memory, which is a RAM-type memory. The role of this memory is to store picture data after decompressing them by the MPEG decoder 5. Next, the vision display module 7 collects data from the video memory 6, in order to transform the picture from a digital form to an analogue signal, which is acceptable by the TV set 11. Prior to the conversion of picture to analogue signal, the vision display module 7 has the possibility of performing certain operations on the picture. These operations include the scaling of picture or reduction of displayed area in such a way that on the TV screen 11 there is shown only a part of the decoded picture, while the rest of the screen is filled with black background. It is also possible to shift the beginning of the displayed picture, and to shift the picture displayed on the TV screen 11 with respect to the beginning of the screen. The viewing of pictures is realized with the module of scrolling frames or pictures 8, which allows for continuous insertion and removal of successive pictures. The process of pictures viewing is controlled by the control system 9, which comprises the memory of data and codes 10. The memory of data and codes 10 is a standard RAM/ROM memory. It contains the code of executed program and stores data.

Figure 2:
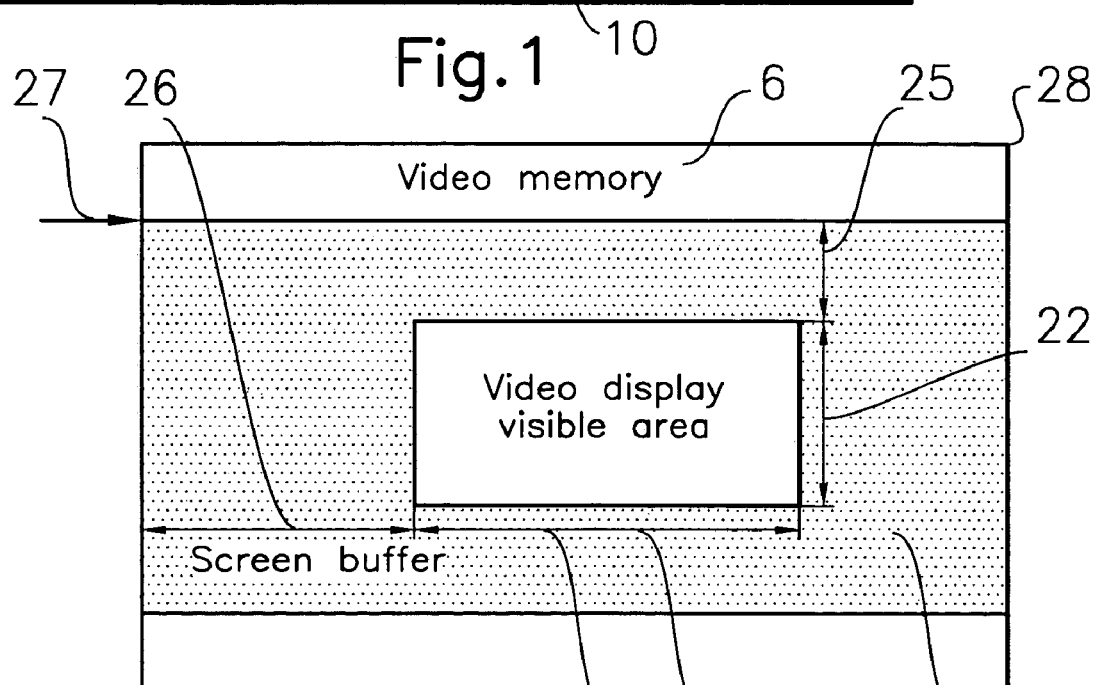
FIG. 2 shows the area of a picture prepared for display on the screen.

FIG. 2 shows the visible area 21 of the screen buffer, which in short has been called the viewing area 21. The visible area 21 of the screen buffer has a display height 22 and a display width 23. It is placed at the background of the picture 28 generated in the screen memory 6 below the pointer of the screen buffer 27, in the distance of one vertical display interval 25. It is also placed in the distance of one horizontal display interval 26 from the edge of the screen buffer 24. The visible area 21 of the screen buffer may be positioned in any place of the screen. The screen buffer pointer 27 is used to define the data of the screen buffer 24 at the background of the picture 28 generated in the screen memory 6. The vertical display interval 25 is used to define the number of lines of picture stored in the screen buffer 24 which should be neglected by the vision display module 7, when its digital data are being transformed into analogue signal. The horizontal display interval 26 is used to define the number of pixels in the picture stored by the screen buffer 24 which should be neglected by the vision display module 7, when its digital data are being transformed into analogue signal. The display height 22 is used to define the number of picture lines stored by the screen buffer 24 which should be transformed into analogue signal by the module of vision display 7. The display width 23 is used to define the number of picture lines stored by the screen buffer 24 which should be transformed into analogue signal by the module of vision display 7.

Figure 3:
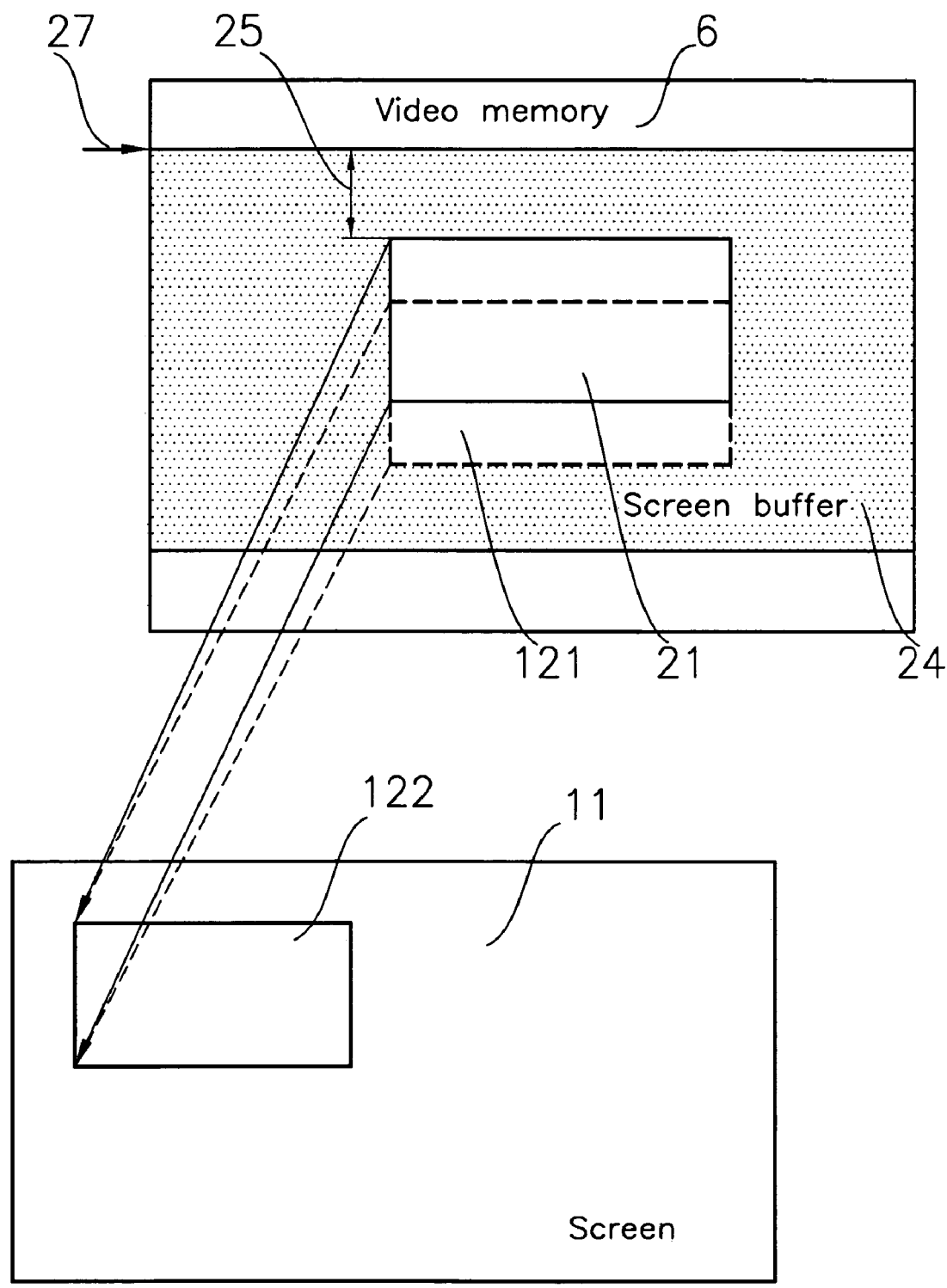
FIG. 3 shows a method used to increase the vertical interval of display.
Figure 4:
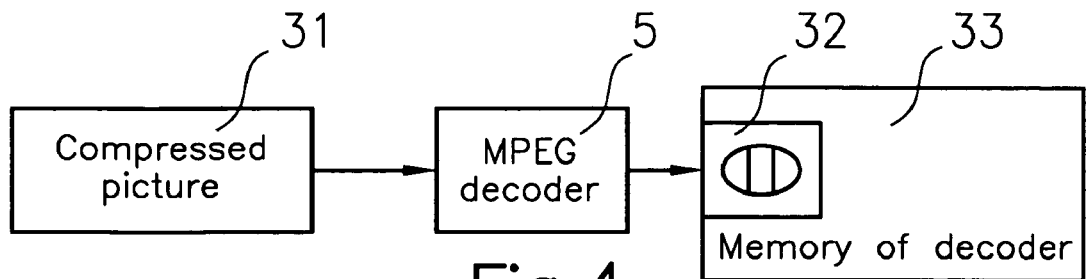
FIGS. 4, 5, 6, 7, 8, and 9 show a mechanism of pictures decoding and scrolling.
Figure 5:
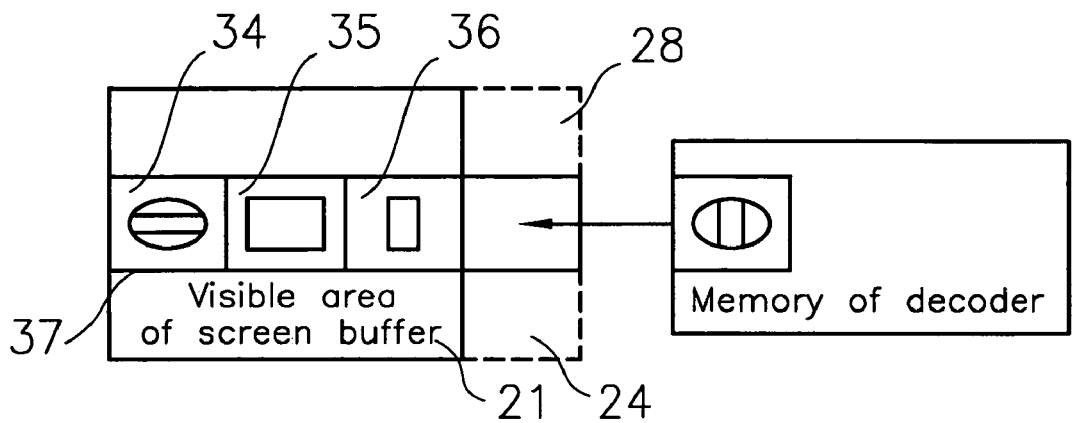
Figure 6:
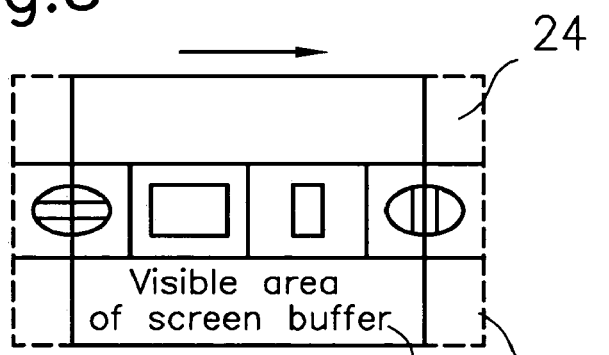

FIG. 3 shows the method of increasing the vertical display interval, when the visible area of the screen buffer 21 has been shifted downward to the position 121, where the new vertical display interval 125 corresponds to the moment when the scrolling of one picture has been completed. The position 122 of the visible area at the screen is constant. The effect of scrolling is obtained through the change of the number of those picture lines stored in screen buffer 24 which are neglected in process of transformation to analogue signal performed by the module of vision display. The number of displayed lines is constant. For example, when some lines are dropped in the upper section of the screen, some other lines are introduced in the lower section. The speed of scrolling can be controlled by regulation of the number of lines added in the vertical display interval in a single step.

FIGS. 4, 5, 6, 7, 8, and 9 show the methods of decoding and scrolling pictures.

Figure 7:
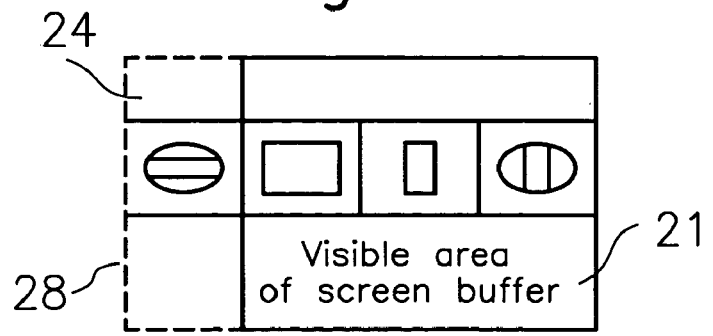
Figure 8:
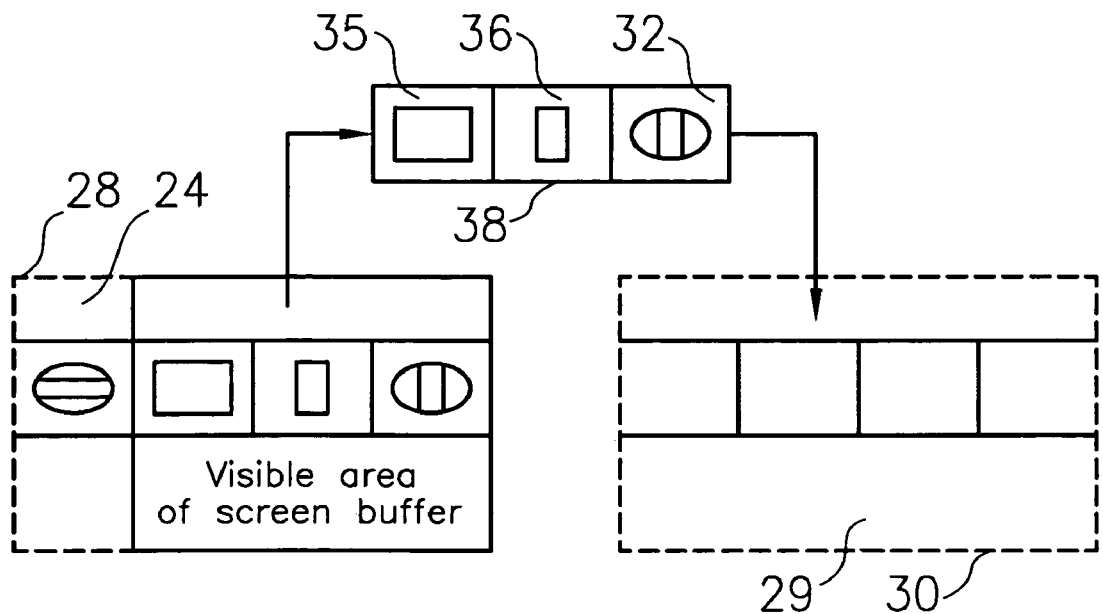
Figure 9:
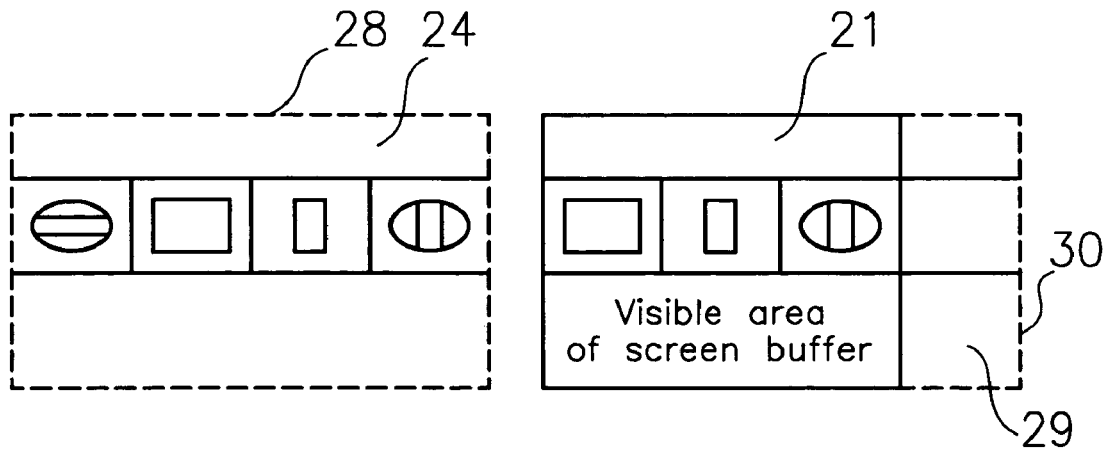

Any compressed picture 31 taken from the set of pictures or picture sequences, where each item is matched to a unique number, is decoded by the MPEG decoder 5 and placed in the memory 33 of the MPEG decoder 5 in the form of the decoded picture 32. Therefrom it is transferred to the screen buffer 24. The retrieval of a picture or a sequence of pictures is performed automatically, or in a pre-set way, or after the ordinal numbers to be displayed have been entered. The decoded picture 32 is adjoined to the group of pictures 32 consisting of discretionary pictures 32, 35, and 36, and placed in the first buffer A of the screen buffer 24 outside the visible area of the screen buffer 21. The effect of picture scrolling is obtained by shifting the visible area of the screen buffer 21. In consequence, the left marginal picture 34 is removed from the visible area of the screen buffer 21. Simultaneously, the decoded picture 32 is placed within the visible area of the screen buffer 21. When the shift of the visible area of the screen buffer 21 is completed, as shown in FIG. 7, a new group of pictures 38 is copied, excluding the left marginal picture 34, but including the decoded picture 32 from the first buffer A to the second buffer B. As a result, at the left side of the new group of pictures 38, a place is prepared for the next decoded picture. Thus, the second buffer B becomes the first buffer A, and the process of adjoining a successive decompressed picture can start.

In the course of transferring the picture to the first screen buffer 24 and to the second screen buffer 29, the new picture 32 is re-scaled. In effect, its dimension measured along the direction of pictures scroll is equal to the dimension of the visible area 21 of the screen buffer, measured along the direction of pictures scroll, divided by the number of shown pictures.

After re-scaling the new picture 32, its dimension measured perpendicularly to the direction of pictures scroll is changed in proportion to the change of the dimension measured along the direction of pictures scroll. The dimension of the visible area 21 of the screen buffer, measured perpendicularly to the direction of pictures scroll is equal to the dimension of the re-scaled picture measured perpendicularly to the direction of pictures scroll.

Figure 10:
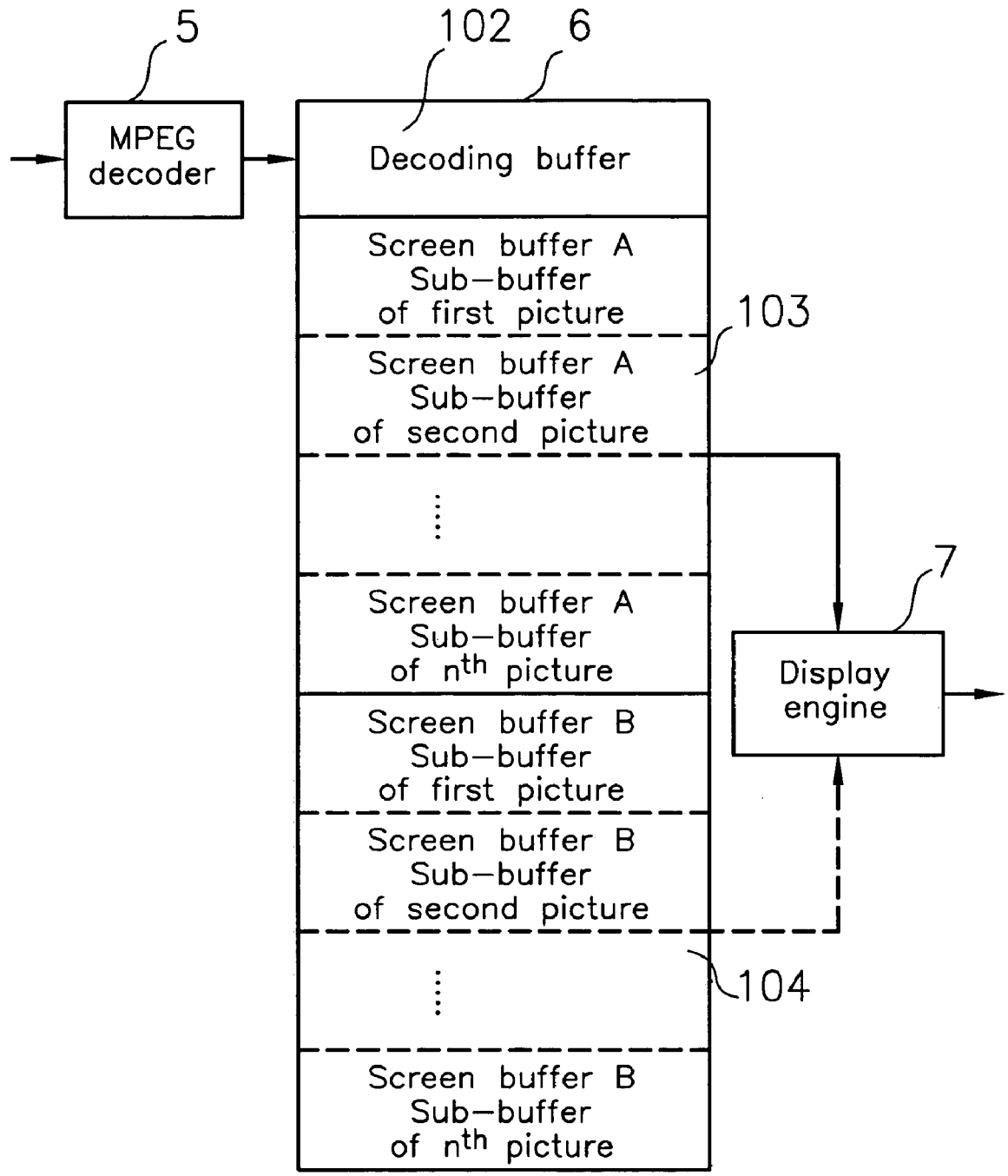
FIG. 10 shows a structure of a screen memory.

FIG. 10 shows the structure of the screen memory §, with indicated memory areas of decoding buffer 102, the first screen buffer A with sub-buffers 103, and the second screen buffer B with sub-buffers 104.

Figure 11:
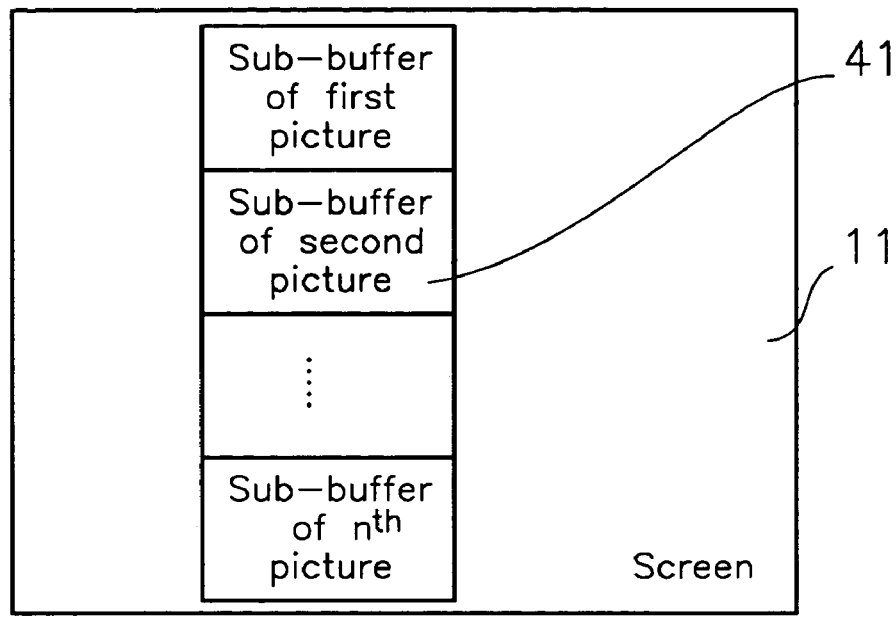
FIG. 11 shows a method of displaying the sub-buffers on the screen in the case of vertical scroll.
Figure 12:
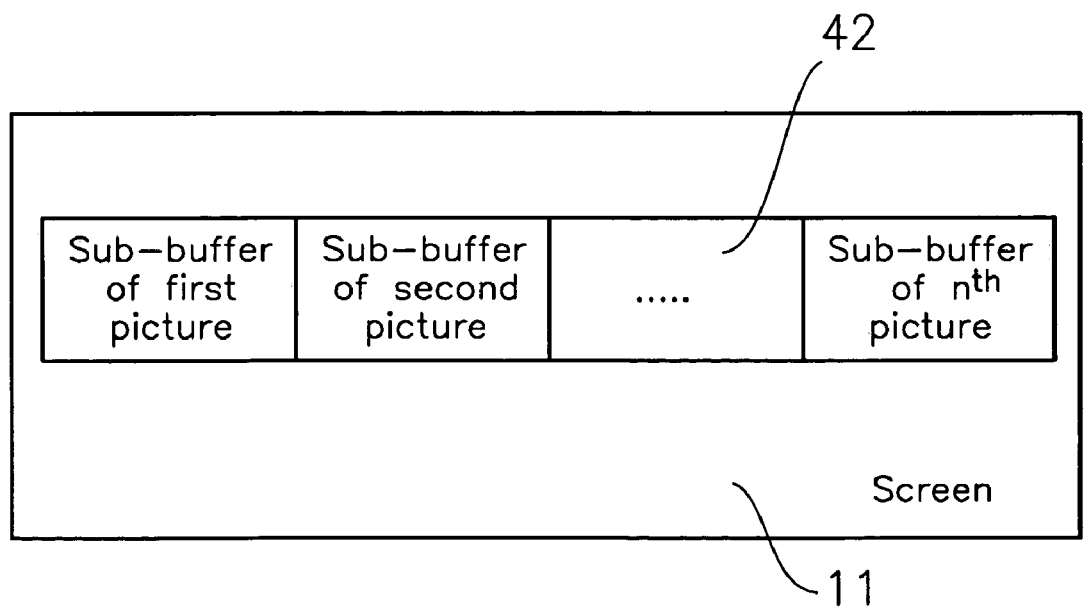
FIG. 12 shows a method of displaying the sub-buffers on the screen in the case of horizontal scroll.

FIG. 11 shows the sub-buffers 41 in the course of displaying n pictures on the screen of the TV set 11 with vertical scroll. FIG. 12 shows the sub-buffers 42 in the course of displaying n pictures on the screen of the TV 11 set with horizontal scroll.

Figure 13A:
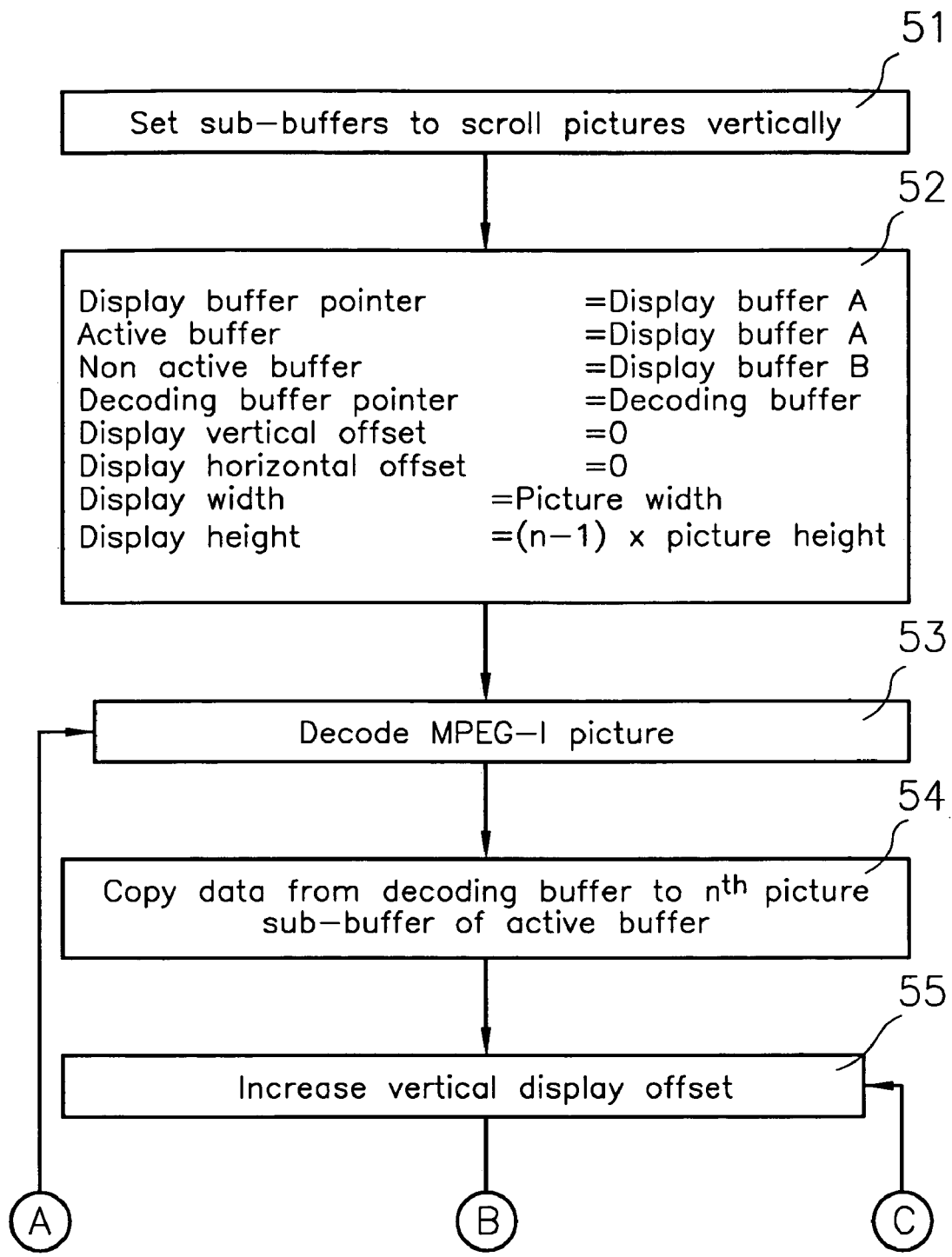
FIGS. 13A, 13B, 14A, 14B, 15A, 15B, 16A, 16B, 17A and 17B show block diagrams of scrolling procedures.
Figure 13B:
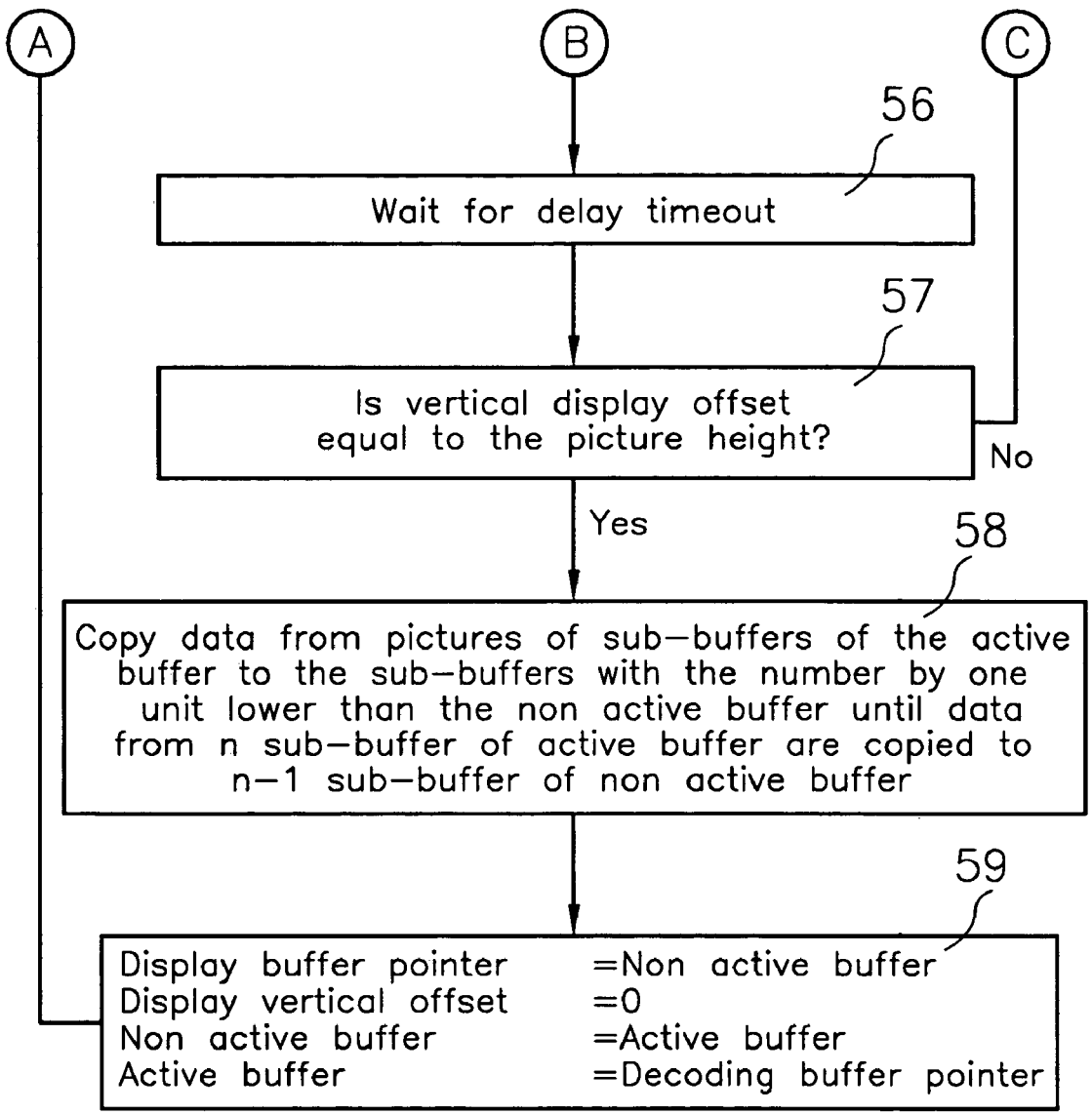

FIGS. 13A and 13B show a block diagram of the algorithm used in the course of vertical scroll upwards. It starts from defining the sub-buffers for vertical scroll of pictures, in block 51. In block 52, it is defined that the first buffer A is the pointer of the screen buffer and the active buffer, while the second buffer B is the inactive buffer, and the decoding buffer is the pointer of the decoding buffer. The vertical display interval, and the horizontal display interval have the imposed value of zero, the display width has the imposed width of the picture, and the display height has the imposed value equal to the sum of the heights of n-1 pictures. After the picture has been decoded by the MPEG decoder in block 53, data are copied from the decoding buffer to the frame of n-sub-buffers of the active buffer in block 54. In block 55, the vertical display interval is increased and the scrolling loop begins. The scrolling loop ends in block 57, where the vertical display interval attains the value equal to the picture height. The increase of the vertical display interval is effected through the change of the number of those picture lines stored in the screen buffer which are neglected in the course of processing in the vision display module, leading to the analogue signal. In block 56, the signal waits for delay timeout, which serves two purposes. Firstly, it introduces the delay necessary for the viewer to observe the effect of the shift in picture content, and secondary, it synchronises the change in the position of the visible area of the screen buffer with the synchronisation pulses of vertical video signal, which is transmitted to the TV set, in order to avoid interference on the displayed picture. In effect, the position of the visible area of the screen buffer is changed in a safe moment, for example in the moment when the TV set is not receiving active lines of video signal. When the vertical display interval attains the value equal to the picture height, the pictures are copied from the active buffer to the inactive buffer in such way that the data from particular pictures are copied from the sub-buffers of the active buffer to the sub-buffers bearing the ordinal number one unit lower than the inactive buffer. It means that the data from the sub-buffer of the second active buffer are copied to the sub-buffer of the first inactive buffer, and so on, until the data from the n-th sub-buffer of the active buffer are copied the to (n-1)-th sub-buffer of the inactive buffer. In block 59, it is defined that the inactive buffer is the pointer of the screen buffer, the vertical display interval is equal to zero, the inactive buffer is the buffer which had been active previously, and the active buffer is the buffer currently displayed which was previously the inactive buffer.

Figure 14A:
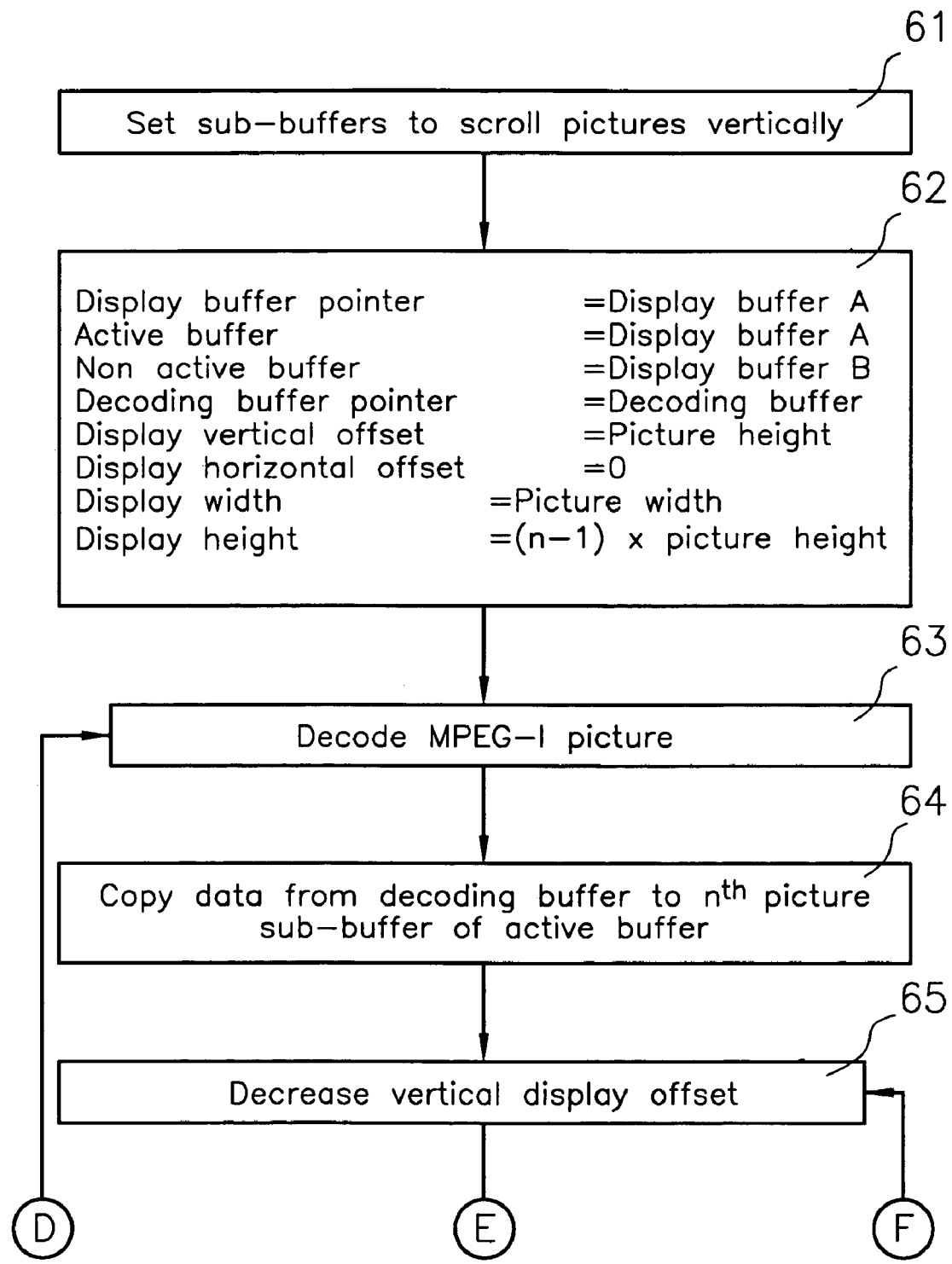
Figure 14B:
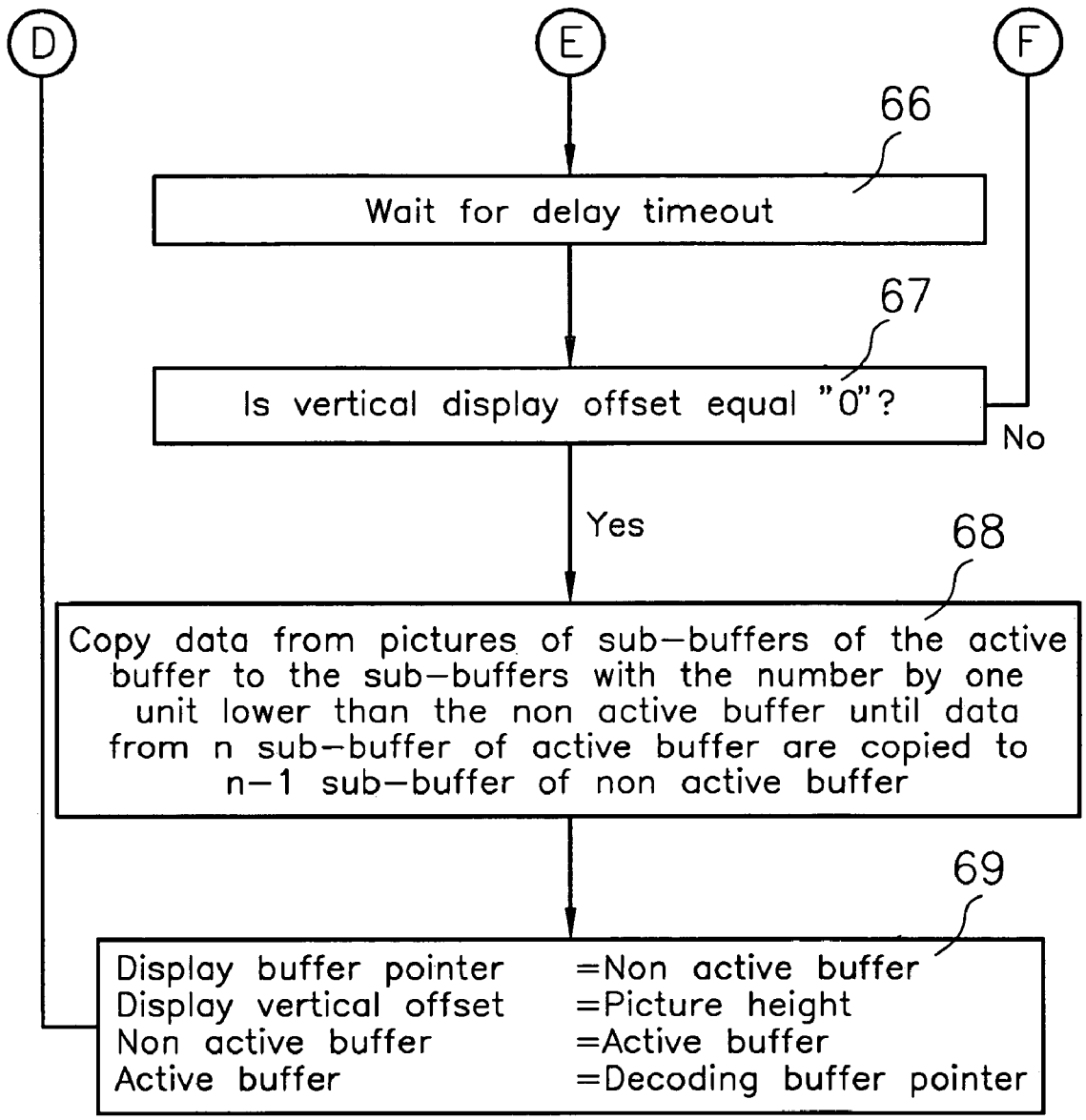

FIGS. 14A and 14B show the block diagram of the algorithm used in vertical scroll downwards, which starts from the definition of sub-buffers used in vertical picture scroll, in block 61. In block 62, it is defined that the first buffer A is the pointer of the screen buffer and the active buffer, the second buffer B is the inactive buffer, and the decoding buffer is the pointer of the decoding buffer. The vertical display interval is equal to the picture height, and the horizontal display interval has the imposed value of zero. The display width has the imposed value of the picture width, and the display height has the imposed value equal to the sum of the heights of n-1 pictures. After the picture has been decoded in the MPEG decoder in block 63, the data are copied from the decoding buffer to the frame of the first sub-buffer of the active buffer, in block 64. In block 65, the vertical display interval is reduced, and the scrolling loop begins, which ends in block 67, when the vertical display interval attains the value of zero. In block 66, the signal waits for delay timeout. When the vertical display interval attains the value of zero, data are copied from the active buffer to the inactive buffer in such way that the data pertaining to individual pictures from the sub-buffers of the active buffer are copied to the sub-buffers bearing the ordinal number one unit higher than the inactive buffer. It means that the data from the sub-buffer of the first active buffer are copied to the sub-buffer of the second inactive buffer, and so on, until the data from the (n-1)-th sub-buffer of the active buffer are copied to the n-th sub-buffer of the inactive buffer. In block 69, it is defined that the inactive buffer is the pointer of the screen buffer, the vertical display interval is equal to the picture height, the inactive buffer is the buffer which had been active previously, and the active buffer is the buffer currently displayed (previously inactive).

Figure 15A:
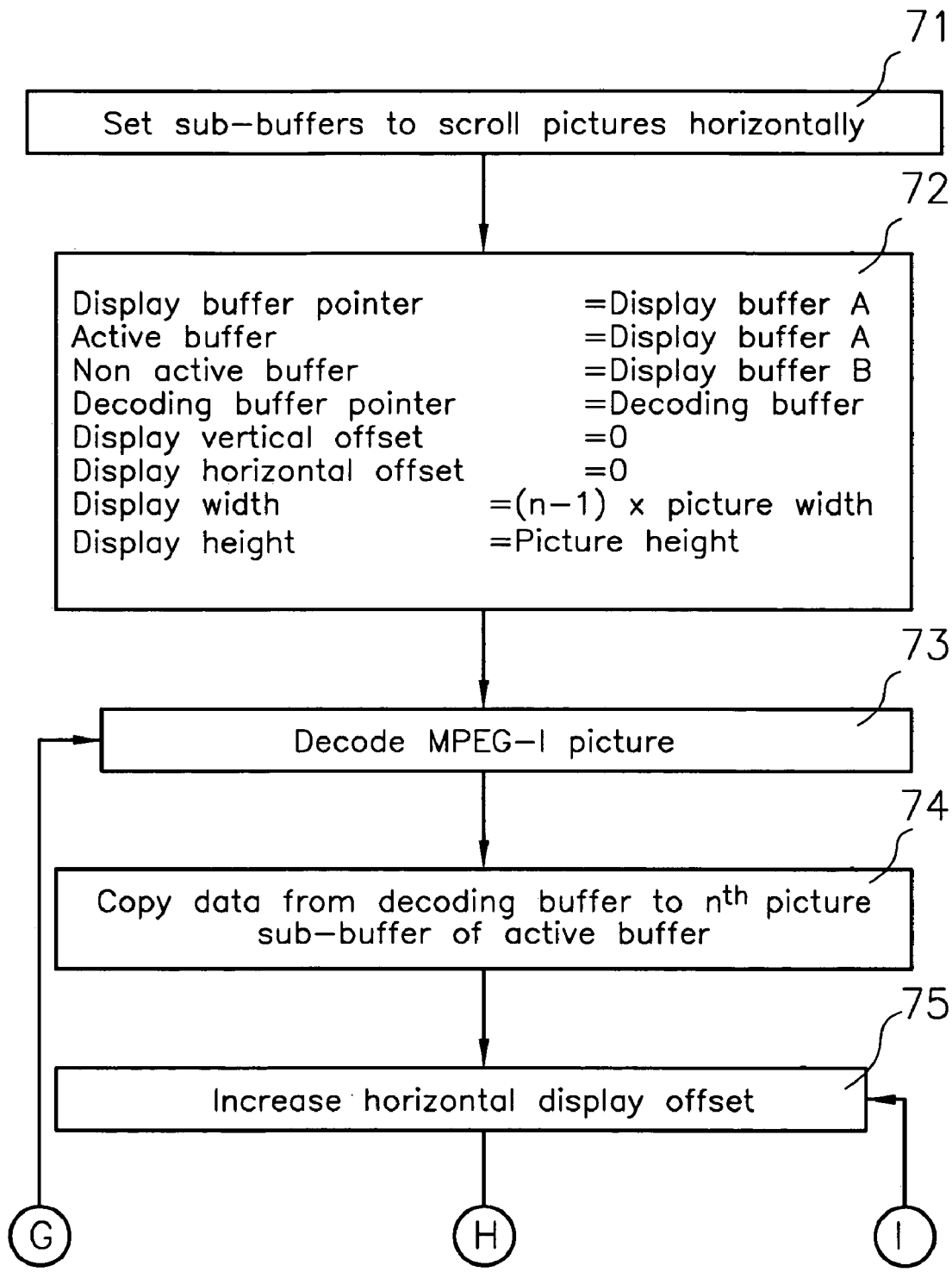
Figure 15B:
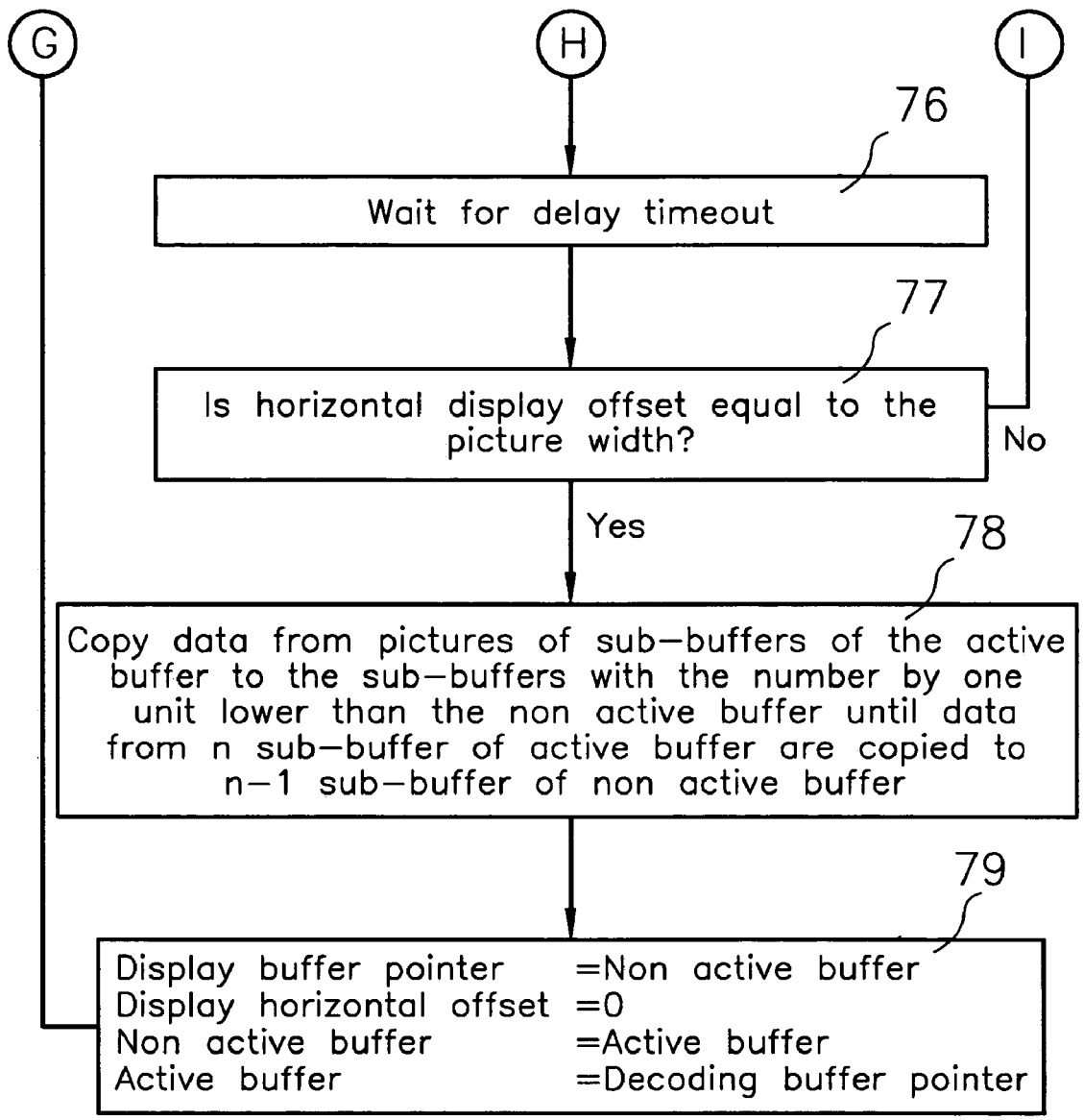

FIGS. 15A and 15B show the block diagram of the algorithm used in horizontal scroll leftwards, which starts from defining the sub-buffers used in horizontal scrolling of pictures, in block 71. In block 72, it is defined that the first buffer A is the pointer of the screen buffer and the active buffer, the second buffer B is the inactive buffer, and the decoding buffer is the pointer of the decoding buffer. The vertical display interval and the horizontal display interval have the imposed value of zero. The display width has the value equal to the sum of the widths of n-1 pictures, and the height of the display has the imposed value equal to the picture height. After the picture has been decoded in the MPEG decoder in block 73, data are copied from the decoding buffer to the frame of n sub-buffers of the active buffer, in block 74. In block 75, the horizontal display interval is increased through the increase of the number of passed-over pixels. The scrolling loop starts, which ends in block 77, when the horizontal display interval attains the value equal to the picture width. The speed of increase of the horizontal display interval is effected through the change in the number of those pixels stored in the screen buffer which are neglected while processing the signal to analogue form in the module of vision display. In block 76, the signal waits for delay timeout. When the vertical display interval attains the value equal to the picture width, data are copied from the active buffer to the inactive buffer in such a way that the data pertaining to individual pictures are copied from the sub-buffers of the active buffer to the sub-buffers bearing the ordinal number by one unit lower than the inactive buffer. It means that data from sub-buffer No. 2 of the active buffer are copied to sub-buffer No. 1 of the inactive buffer, and so on, until the data from the n-th sub-buffer of the active buffer are copied to the (n-1)-th sub-buffer of the inactive buffer. In block 79, it is defined that the inactive buffer is the pointer of the screen buffer, the horizontal display interval is zero, the previously active buffer is now the inactive buffer, and the active buffer is the buffer currently displayed (previously inactive).

Figure 16A:
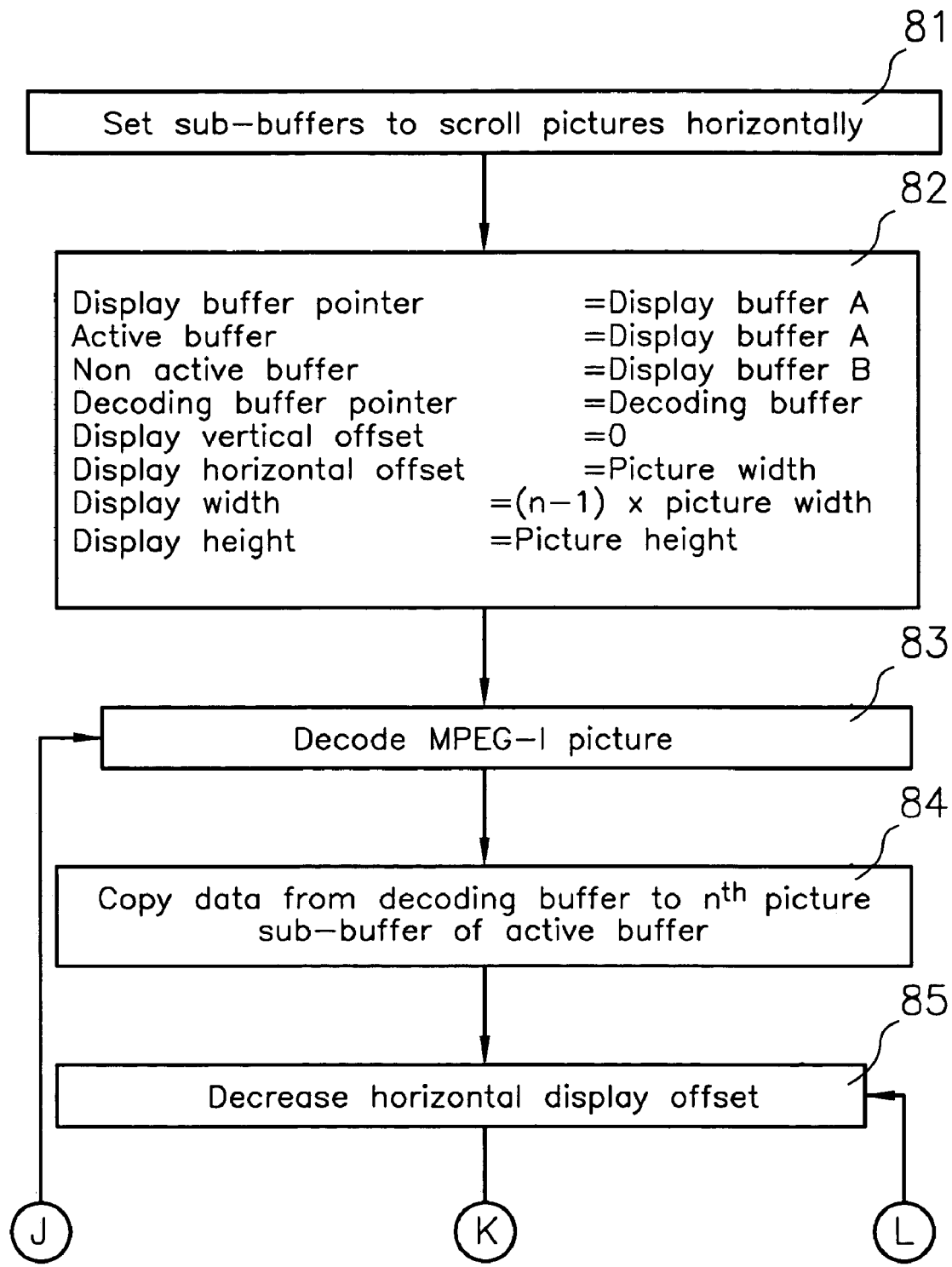
Figure 16B:
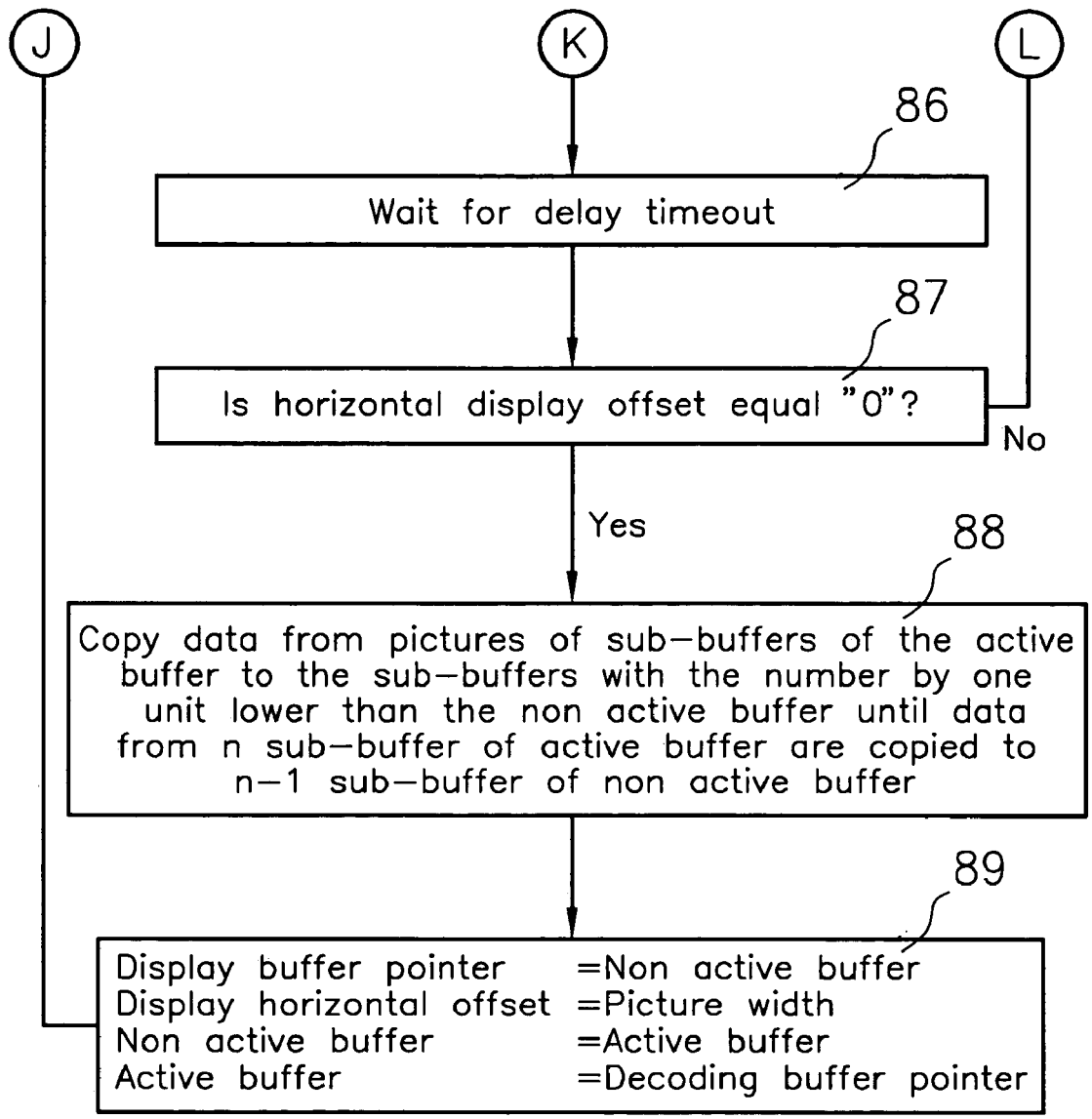

FIGS. 16A and 16B show the block diagram of the algorithm used in horizontal scroll rightwards, which starts from defining the sub-buffers applied in picture scroll, in block 81. In block 82, it is defined that the first buffer A is the pointer of the screen buffer and the active buffer, while the buffer B is the inactive buffer, and the decoding buffer is the pointer of the decoding buffer. The vertical display interval is zero, and the horizontal display interval has the value equal to the picture width. The display width has the value equal to the sum of the widths of n-1 pictures, and the display height has the imposed height of the picture. After the picture has been decoded in the MPEG decoder, in block 83, data are copied from the decoding buffer to the frame of the fist sub-buffer of the active buffer in block 84. In block 85 the horizontal display interval is reduced, and the scrolling loop begins. The loop ends in block 87, where the horizontal display interval attains the value of zero. In block 86, the signal waits for delay timeout. When the vertical display interval reaches zero, picture data are copied from the active buffer to the inactive buffer in such a way, that the data belonging to particular pictures are copied from the sub-buffer of the active buffer to the sub-buffer bearing the ordinal number by one unit higher than the inactive buffer. This means that the data from the sub-buffer of the first active buffer are copied to the sub-buffer of the second inactive buffer, and so on, until the data from the (n-1)-th sub-bufferof the active buffer have been copied to the n-th sub-buffer of the inactive buffer. In block 89, it is defined that the inactive buffer is the pointer of the screen buffer, the horizontal display interval is equal to picture width, previously active buffer is now the inactive one, the currently displayed (previously inactive buffer) is now the active one.

Figure 17A:
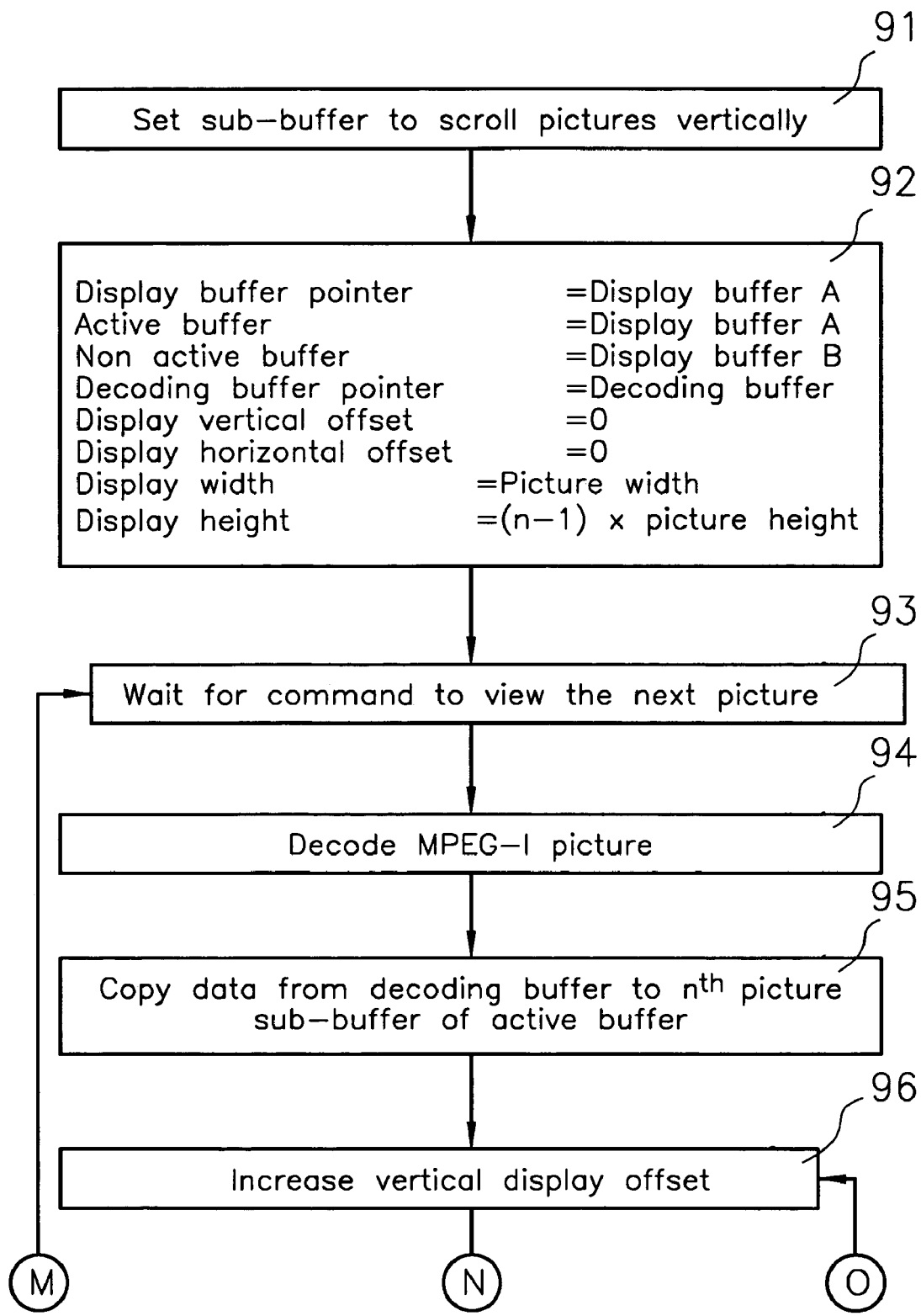
Figure 17B:
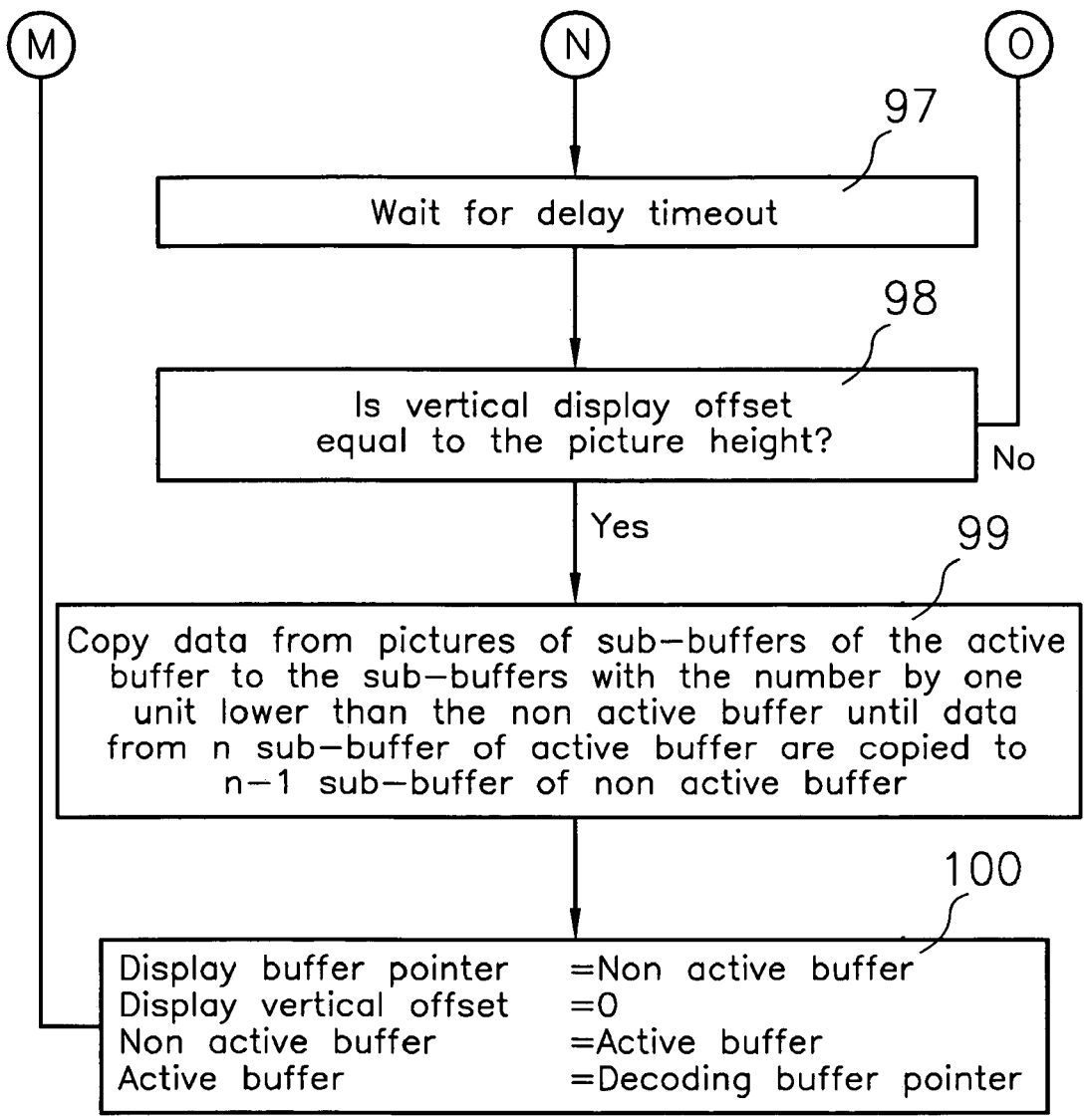

FIGS. 17A and 17B show the block diagram of the algorithm used in vertical upwards scroll, including waiting for the command to view the next picture. The algorithm starts from the definition of sub-buffers used in vertical scroll of pictures, in block 91. In block 92, it is defined that the buffer A is the pointer of the screen buffer and the active buffer, while the buffer B is the inactive buffer, and the decoding buffer is the pointer of the decoding buffer. The vertical display interval and the horizontal interval have the imposed value of zero, the display width has the imposed width of the picture, and the display height has the imposed value equal to the sum of the heights on n-1 pictures. After waiting for the command to view the next picture, in block 93, and decoding the picture by the MPEG decoder, in block 94, data are copied from the decoding buffer to the frame of n sub-buffers in the active buffer, in block 95. The vertical display interval is increased in block 96 and the scrolling loop begins. The scrolling loop ends in block 98, where the vertical display interval reaches the value equal to the picture height. When the vertical display interval attains the value of the picture height, picture data are copied from the active buffer to the inactive one, in block 99. In block 100, it is defined that the inactive buffer is the pointer of the screen buffer, the vertical display interval is zero, the inactive buffer is the active buffer, the currently displayed buffer, which was previously inactive, is now the active buffer.

The advantage of the above presented scrolling method of pictures compressed in the MPEG standard is the possibility to compare any new displayed picture with any number of pictures previously shown on the screen. The insertion of a new picture is performed fluently and any number of pictures can be displayed simultaneously.

It will be understood that each of the elements described above, or two or more together, may also find a useful application in other types of methods for scrolling compressed pictures differing from the types described above.

While the invention has been illustrated and described as embodied in the context of a method for scrolling MPEG-compressed pictures, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for scrolling MPEG-compressed pictures comprising the following steps:
   decoding by an MPEG decoder (5) and storing in an MPEG decoder memory (33) a sequence of pictures or any two pictures to be viewed chosen from a set of pictures or picture sequences to be scrolled;
   forming a group of pictures (37) from the sequence of pictures or from at least two pictures;
   transferring the group of pictures (37) to a first screen buffer (24) which is active and displaying the group of pictures (37) on a screen;
   selecting any another compressed picture (31) from the set of pictures or the picture sequences to be scrolled, decoding the compressed picture (31) in the MPEG decoder (5) and storing it in the MPEG decoder memory (33) as a decoded new picture (32);

transferring the decoded new picture (32) from the decoder memory (33) to the first screen buffer (24), adjoining the decoded new picture (32) to the group of pictures (37) and placing the decoded new picture outside a viewing area, wherein an edge of the decoded new picture (32) perpendicular to an intended scrolling direction is adjoined to the external edge of the group of pictures (37);

shifting the entire viewing area (21) until the marginal picture lying at the opposite side of the group of pictures (37) in relation to the adjoined new picture (32) is removed from the viewing area and placing a new group of pictures excluding a removed picture and including the decoded new picture (32) and at least one neighbouring picture in the viewing area;

copying the new group of pictures (38) excluding the removed picture and including the decoded new picture (32) from the first screen buffer (24) which is active to a second screen buffer (29) which is inactive; and inactivating the first screen buffer (24) through shifting the viewing area from the first screen buffer (24) to the second screen buffer (29), in order to display on the screen the new group of pictures which had been copied to the second screen buffer (29).

2. The method for scrolling MPEG-compressed pictures according to claim 1, further comprising the following steps:

matching a unique ordinal number to each picture or picture sequence chosen from the set of pictures or picture sequences to be scrolled; and selecting any further compressed picture from the set of pictures or the picture sequences to be scrolled using the unique ordinal number.

3. The method for scrolling MPEG-compressed pictures according to claim 2, characterised in that the unique ordinal number is matched to each picture or picture sequence chosen from the set of pictures or picture sequences during formulation of the set of pictures and sequence of pictures.

4. The method for scrolling MPEG-compressed pictures according to claim 2 characterised in that the matching of the unique number to each picture or sequence of pictures chosen from the set of pictures or picture sequences is realized in the MPEG decoder after the decoding procedure executed in the MPEG decoder.

5. The method for scrolling MPEG-compressed pictures according to claim 2, characterised in that the matching of the unique number to each picture or sequence of pictures is realized during storing said picture or sequence of pictures in the screen memory.

6. The method for scrolling MPEG-compressed pictures according to claim 1, characterised in that during sending the picture to the first screen buffer (24), or to the second screen buffer (29), a new picture is re-scaled and its dimension measured in the direction of picture scroll is equal to the dimension of the visible area of the screen buffer measured in the shift direction of pictures divided by the number of displayed pictures.

7. The method for scrolling MPEG-compressed pictures according to claim 1, characterised in that vertical shifting of viewing area is obtained by changing the number of image lines neglected in the course of signal transformation to analogue form, while the number of lines contributing to total viewing area remains constant.

8. The method for scrolling MPEG-compressed pictures according to claim 1, characterised in that shifting of displayed area in horizontal direction is obtained by changing the number of pixels to be executed in the course of transformation to analogue signal, while the number of pixels contributing to display area remained constant.

9. The method for scrolling MPEG-compressed pictures according to claim 1, characterised in that the selection of the sequence of pictures, or at least any two pictures, and the choice of any compressed picture to be displayed, is realized after the codes are entered pertaining to any pictures or compressed pictures related to the set of pictures or picture sequences.

10. The method for scrolling MPEG-compressed pictures according to claim 1, characterised in that selection of the sequence of pictures, or at least any two pictures, and the choice of any compressed picture is realized automatically.

11. The method for scrolling MPEG-compressed pictures according to claim 1, characterised in that selection of the sequence of pictures or at least any two pictures, and the choice of any compressed picture is realized in a pre-set way.

12. The method for scrolling MPEG-compressed pictures according to claim 1, characterised in that after re-scaling the new picture, its dimension measured perpendicularly to the movement direction of pictures is changed proportionally to the change of dimension measured in the movement direction of pictures, while the dimension of the visible area of screen buffer measured perpendicularly to the movement direction of pictures is equal to the dimension of the re-scaled picture measured perpendicularly to the movement direction of pictures.

* * * * *